UNITED STATES PATENT OFFICE.

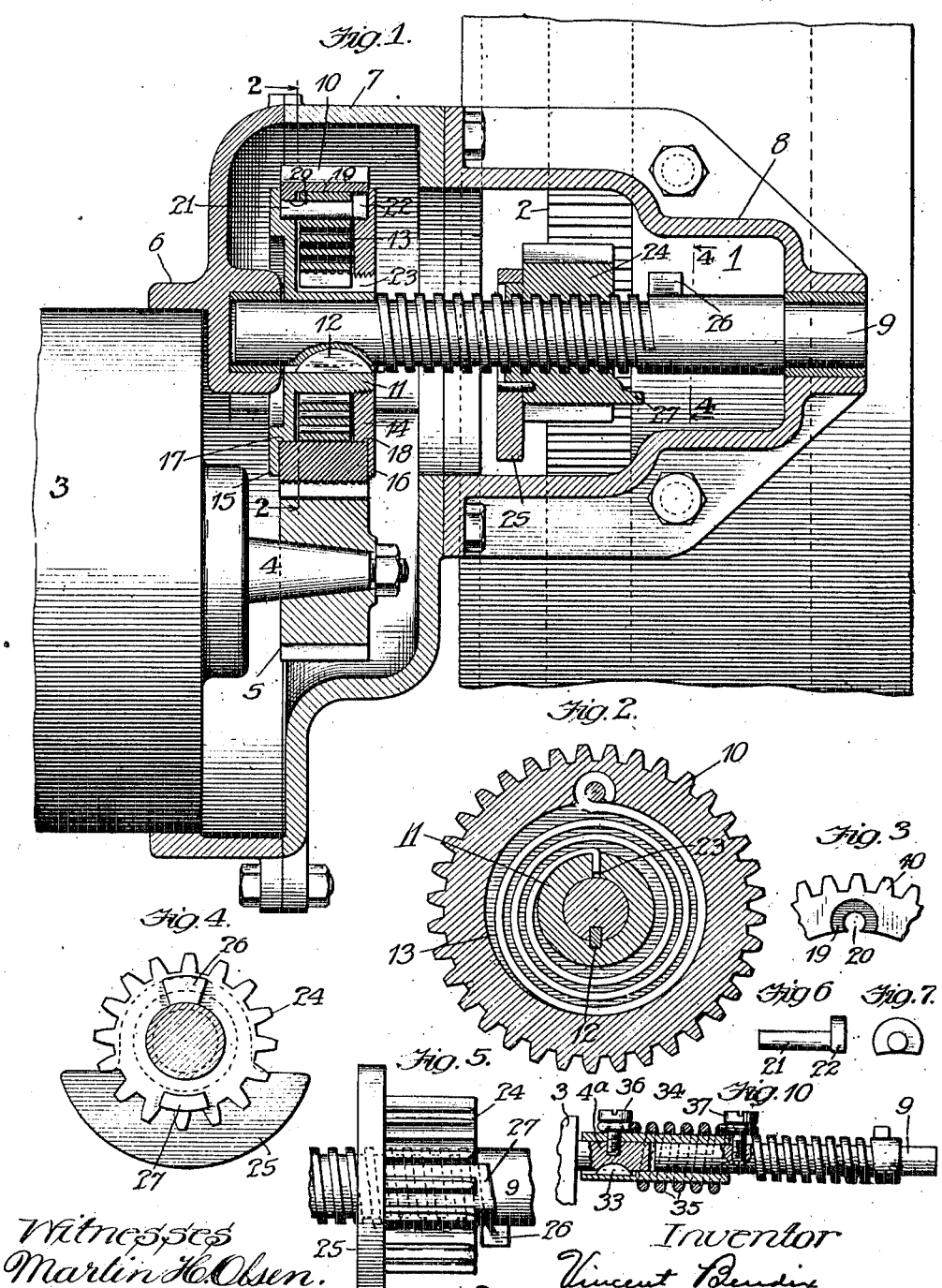

VINCENT BENDIX, OF CHICAGO, ILLINOIS.

STARTER FOR ENGINES.

1,116,370.  Specification of Letters Patent.  Patented Nov. 10, 1914.

Application filed December 3, 1913. Serial No. 804,526.

*To all whom it may concern:*

Be it known that I, VINCENT BENDIX, a citizen of the United States, residing at Chicago, Cook county, Illinois, have invented new and useful Improvements in Starters for Engines, of which the following is a specification.

My invention relates to a starter more particularly for a gas engine and the like, and the object thereof is to provide a simple, reliable and efficient automatic device of this character. My starter pertains to that type in which are employed a supporting member such as a screw shaft, and a driving member such as a pinion capable of both a longitudinal movement on the shaft and a rotary movement therewith, and the object of my invention is to provide simple and efficient means for preventing shock that might otherwise occur in initial starting when the driving member or pinion ceases its longitudinal travel and begins to rotate with the screw shaft for the purpose of driving any member such as a fly wheel operatively connected with the engine. The same means is also capable of taking up back lash that might otherwise occur when the engine goes over the compression points, the uneven running of the engine member or fly wheel having a tendency to withdraw the pinion from mesh or to start its movement in that direction when the wheel speeds up after passing a compression point, thereby tending to cause a vibration of the pinion on the screw shaft. Speaking in general terms, the means which I have provided for the purposes described consists of a simple and efficient yielding driving connections interposed in the driving connections between the motor and the screw shaft or driving member.

Figure 8:
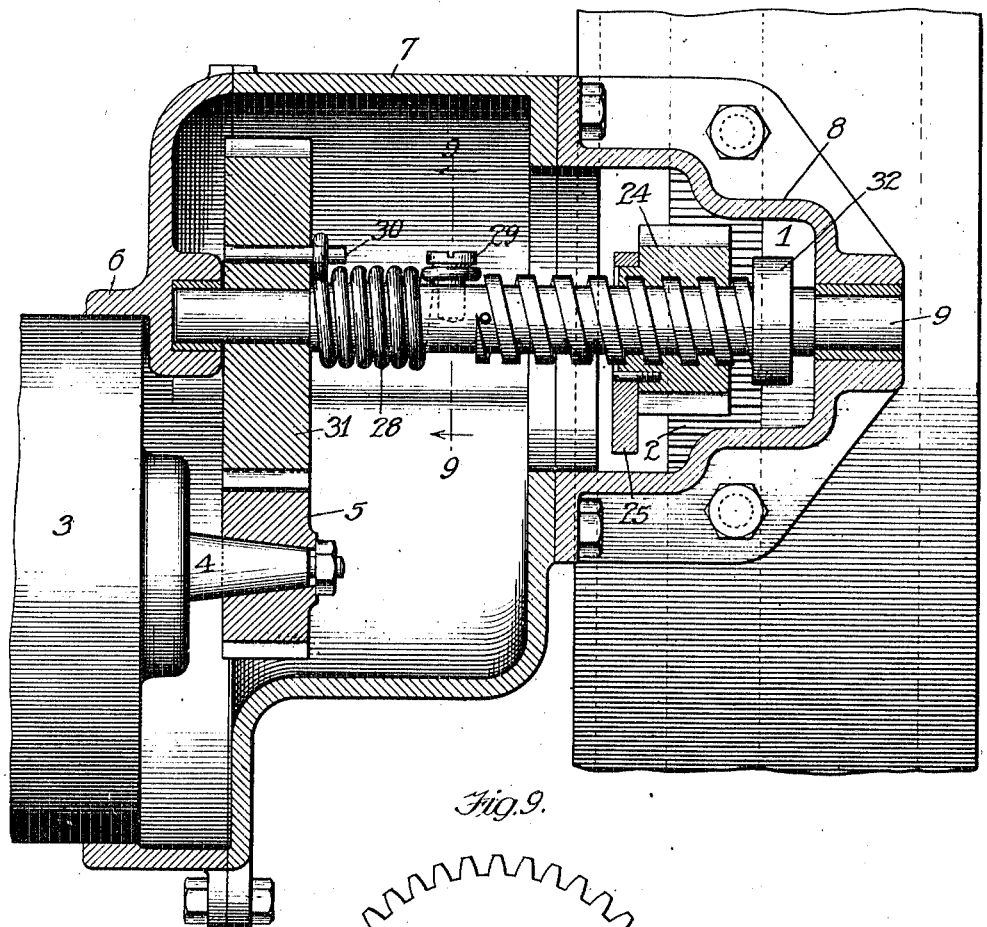
Figure 9:
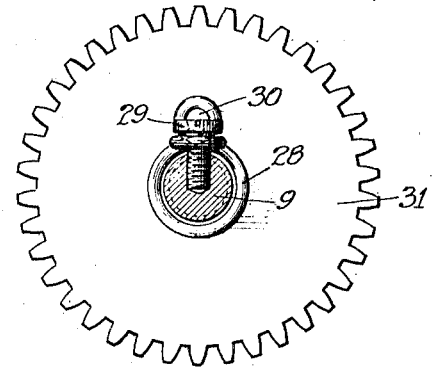

In the drawing, Figure 1 is a sectional elevation of one embodiment of my invention; Fig. 2 a detail section taken substantially on the line 2—2 of Fig. 1; Fig. 3 a detail elevation of a portion of the gear ring; Fig. 4 a sectional elevation on the line 4—4 of Fig. 1; Fig. 5 a plan view of the pinion and a portion of the screw shaft; Fig. 6 an elevation of the anchoring pin for the spring; Fig. 7 an end view thereof; Fig. 8 a sectional elevation showing a modified form of construction; Fig. 9 a section on line 9—9 of Fig. 8; and Fig. 10 a sectional elevation of another modified form.

In the present instance and by preference the motor employed is an electric motor, the supporting member is a screw shaft, the driving member is a pinion, and the engine member or wheel which is driven by such pinion and operatively connected with the engine is the fly wheel thereof, although it will be understood that my invention in its broader aspect is not to be limited to such motor, screw shaft, pinion, or fly wheel, but that other kinds of motors and driving connections than the specific ones herein illustrated and described for the purposes of a clear and accurate description of my invention may be employed. It will also be understood that the engine member which is operatively connected with the engine and which is to be driven by the starting device may be any member or wheel or other driving connection connected directly or indirectly with the engine, so that the movements of the motor and its driving member will start the engine into operation. In addition, it will be understood that the rotatable shaft on which the driving member or pinion is mounted may be driven either directly or indirectly by the motor, that is to say, such shaft may be either the armature shaft extended or coupled by means of a yielding driving connection to the screw shaft or may be an entirely separate shaft in the manner of a countershaft driven by a gear from the armature shaft with a yielding driving connection between the gear and the shaft. In the present instance I have shown the latter method of drive but my invention in its broader aspect is not to be limited thereto. Furthermore, it will be understood that while I have herein shown spur gearing between the pinion and the engine wheel, whether it be the fly wheel or not, and have consequently shown the pinion as movable in a line parallel with the axis of the wheel, worm gearing might be employed, the worm corresponding to the pinion shown as being movable in a plane at right angles to the axis of rotation of the fly wheel.

Referring to the specific embodiment of my invention as herein illustrated, the engine member is here shown as a fly wheel 1 provided on its periphery with a circular rack or with gear teeth 2 of the spur type. The motor 3 is an electric motor having an armature shaft 4 to whose outer end is secured a pinion 5. The motor is mounted at one end in a housing which is secured to any fixed part of the automobile or other structure with which this device may be associated and which here comprises three sections 6, 7 and 8, all secured together in suitable manner as by bolting. Within this housing and in a plane intersecting the axis of the fly wheel is mounted a rotatable screw shaft journaled at its ends in bearings provided in the sections 6 and 8 of the housing. The drive employed in the instance being described is of the indirect type, that is to say, the shaft 9 is a countershaft with respect to the armature shaft, although it will be understood that the particular character of drive is not essential and that the invention in its broader aspect is equally applicable to the direct drive. As shown in Fig. 1, a gear is interposed between the pinion 5 and the screw shaft, this gear being made in a peculiar manner and containing a yielding driving connection in the form of a coiled spring. This gear comprises a gearing 10, a hub or shell 11 secured to the shaft 9 by the key 12, a coiled spring 13 and a side plate 14. The gear ring 10 is adapted to mesh with the pinion 5 and is supported so as to rotate in unison with the hub 11 and plate 14 and also independently thereof. The hub and the plate have outwardly directed marginal flanges 15 and 16 respectively to provide annular bearing surfaces 17 and 18 respectively for the inner surface of the gear ring.

The spring 13 is a coiled spring having its outer end coiled in the form of an eye and received by and secured in a curved recess 19 which is somewhat greater than a semi-circle in cross section. This recess extends all the way through the gear ring except near the left hand thereof (Fig. 1) where it is a mere hole 20, almost a full circle. As stated the eye of the spring is received in the recess 19 and in order to firmly secure or anchor this end of the spring I provide an anchoring pin 21 whose abutting portion extends through the eye and through the hole 20 and whose head portion 22 is received at the right hand end of the recess 19, that is that portion of such recess not occupied by the spring. The head 22 is of a shape to accurately fit the recess 19, the same being less than a circle and more than a semi-circle in order that it may fit upon the annular bearing surface 18 of the plate 14. The inner end of the spring is secured in a slot 23 in the hub 11. The plate 14 is secured in suitable manner to the hub, in the present instance, by screw threading upon the hub portion proper of the hub or shell.

The screw shaft has a screw threaded intermediate portion, its ends being journaled in the sections 6 and 8 of the housing. Upon this screw threaded portion of the shaft is secured a pinion 24 which is capable of both a longitudinal movement with respect to the shaft and also a rotary movement therewith after it has been moved into mesh with the gear teeth 2 of the fly wheel. In order to assure this longitudinal movement of the pinion I prefer to weight the same by means of the weight 25 formed on or secured to one side of the pinion and on one side of its axis of rotation. For the purpose of positively stopping the outward travel of the pinion by means other than the end of the thread itself, I provide stop mechanism which here consists of a lug 26 extending radially from the surface of the shaft near the ends of the screw threads thereon and also a lug 27 projecting laterally from the outer face of the pinion in position to be struck by the lug 26 after the pinion has traveled outwardly into the path of rotation of such lug.

The above described construction provides a yielding driving connection between the motor and the screw shaft. In the specific instance being described such yielding connection is interposed between the armature pinion 5 and the shaft. When the shaft is running freely, that is before the pinion has meshed with the fly wheel and the two stops 26 and 27 become engaged, the electric motor through its pinion 5 will drive the gear ring 10 and the gear hub or shell and consequently such shaft in unison, the motion of course being transmitted through the spring 13 but the latter not yielding because of the free running of the shaft. When, however, the stops 26 and 27 have engaged and the pinion is substantially in full mesh, then a resistance due to the inertia of the fly wheel and associated parts will be offered to the shaft, with the result that the motor continuing to run will move the gear ring 10 independently of or rather faster than the hub and the screw shaft, thereby winding up the spring 13. When the spring has been thus wound up and the power being transmitted by the motor through the shaft exceeds the resistance offered by the fly wheel, the latter will be rotated so as to start the engine. When the engine is started on its own power, the fly wheel will rotate at a faster speed than when driven by the starting device and as a result the pinion will be automatically moved longitudinally of its shaft to normal or home position, that is to the left, according to Fig. 1. During the starting operation of the engine speed is variable owing to the pistons of the engine passing over the compression points so that the engine speeds up after passing each compression point. This latter movement or increased speed has a tendency to throw out the pinion from mesh or rather to initiate such movement, thereby causing a vibration of the pinion on the screw shaft. My yielding driving connection overcomes this difficulty by speeding up the screw shaft 9 to compensate for the increased speed of the pinion due to the increased speed of the fly wheel just after the compression points are passed. This effect is brought about by the provision of the spring 13 which is capable of thus increasing the speed of the shaft 9 whenever the load of the shaft is relieved to any extent. This action of the spring is positive and instantaneous and takes place faster than the motor can pick up and transmit increased speed. Another practical advantage gained by my yielding driving connection is the elimination or absorption of shock at the time when the pinion ceases its longitudinal travel and starts to rotate with the shaft, which time is represented by the contact between the lugs 26 and 27. This contact is not abrupt or forcible but is cushioned by reason of the yielding driving connection. Still another practical advantage resides in the fact that all noise of engagement of the lugs 26 and 27 is prevented.

In Figs. 8 and 9 I have shown a modified form of construction of the yielding driving connection in which the same is not inclosed in a driving gear as in Fig. 1 but is extraneous thereof. This connection is in the form of a spring 28 coiled around the screw shaft 9 and fastened at one end to a stud 29 anchored to or screwing into said shaft and at its other end to a pin 30 secured in a gear 31. This gear is mounted to rotate freely upon the screw shaft and is driven by the pinion 5 of the motor 3, the same as in the construction of Fig. 1. It will be understood that when the motor is operated the screw shaft will be driven through the medium of the spring 28 with the same results and advantages as in respect to the above-described construction. According to this modification the pinion 24 is stopped in its outward travel by means of a collar 32 formed as a part of or secured to the screw shaft 9.

In Fig. 10 I have shown still another form of yielding driving connection suitable for a direct drive between the electric motor and the screw shaft. As shown the motor 3 has an armature shaft 4ᵃ secured by means of the key 33 to a sleeve 34 fitting thereupon and also over the inner end of the screw shaft 9. A spring 35 coiled around the sleeve is secured at one end to the stud 36 extending into the sleeve and armature 4ᵃ and at its other end to a stud 37 which is secured to the screw shaft. It will be understood that the screw shaft is driven through the medium of the coiled spring which therefore constitutes a yielding driving connection.

I claim:

1. An engine starter comprising in combination with a member operatively connected with the engine, a motor, a rotatable member, a driving member mounted to travel longitudinally on said rotatable member into engagement with said engine member and also to rotate therewith, and a yielding driving connection between the motor and rotatable member.

2. An engine starter comprising in combination with a member operatively connected with the engine, a motor, a rotatable member, a driving member mounted to travel longitudinally on said rotatable member into engagement with said engine member and also to rotate therewith, and a spring driving connection between the motor and rotatable member.

3. An engine starter comprising in combination with a member operatively connected with the engine, a motor, a rotatable member, a driving member mounted to travel longitudinally on said rotatable member into engagement with said engine member and also to rotate therewith, and a coiled spring forming a driving connection between the motor and rotatable member.

4. An engine starter comprising in combination with a member operatively connected with the engine, a motor, a rotatable member, a driving member mounted to travel longitudinally on said rotatable member into engagement with said engine member and also to rotate therewith, a gear mounted on the rotatable member, a spring driving connection between the gear and rotatable member, and a positive driving connection between the gear and the motor.

5. An engine starter comprising in combination with a member operatively connected with the engine, a motor, a rotatable member, a driving member mounted to travel longitudinally on said rotatable member into engagement with said engine member and also to rotate therewith, said motor having a driving pinion, a gear driven thereby and mounted upon the rotatable member, and a yielding driving connection between the gear and rotatable member.

6. An engine starter comprising in combination with a member operatively connected with the engine, a motor, a rotatable member, a driving member mounted to travel longitudinally on said rotatable member into engagement with said engine member and also to rotate therewith, a gear ring mounted concentric with the rotatable member and driven by the motor, also a coiled spring arranged within the gear with one end attached thereto and the other connected with the rotatable member.

7. An engine starter comprising in combination with a member operatively connected with the engine, a motor, a rotatable member, a driving member mounted to travel longitudinally on said rotatable member into engagement with said engine member and also to rotate therewith, a gear ring mounted concentric with the rotatable member and driven by the motor, a coiled spring arranged within the gear with one end attached thereto and the other connected with the rotatable member, said gear having a transverse slot to receive its end of the spring, and a pin passing through said slot and spring end.

8. An engine starter comprising in combination with a member operatively connected with the engine, a motor, a rotatable member, a driving member mounted to travel longitudinally on said rotatable member into engagement with said engine member and also to rotate therewith, a gear ring mounted concentric with the rotatable member and driven by the motor, a coiled spring arranged within the gear with one end attached thereto and the other connected with the rotatable member, said gear having a transverse slot to receive its end of the spring, a pin passing through said slot and spring end, and a hub secured to the rotatable member and forming a support for the ring.

9. An engine starter comprising in combination with a member operatively connected with the engine, a motor, a rotatable member, a driving member mounted to travel longitudinally on said rotatable member into engagement with said engine member and also to rotate therewith, a gear ring mounted concentric with the rotatable member and driven by the motor, a coiled spring arranged within the gear with one end attached thereto and the other connected with the rotatable member, said gear having a transverse slot to receive its end of the spring, the spring end being a loop or eye and the slot being more than a semi-circle in cross section, a pin passing through the spring end and slot, and a hub secured to the rotatable member forming a support for the ring.

10. An engine starter comprising in combination with a member operatively connected with the engine, a motor, a rotatable member, a driving member mounted to travel longitudinally on said rotatable member into engagement with said engine member and also to rotate therewith, a gear ring mounted concentric with the rotatable member and driven by the motor, a coiled spring arranged within the gear with one end attached thereto and the other connected with the rotatable member, said gear having a transverse slot to receive its end of the spring and terminating in a hole at one side of the ring, the spring end being a loop or eye and the slot being more than a semi-circle in cross section, a pin passing through the spring end and entering the hole and having a head fitting the slot, and a hub secured to the rotatable member and forming a support for the ring.

11. An engine starter comprising in combination with a member operatively connected with the engine, a motor, a rotatable member, a driving member mounted to travel longitudinally on said rotatable member into engagement with said engine member and also to rotate therewith, a gear ring mounted concentric with the rotatable member and driven by the motor, a coiled spring arranged within the gear with one end attached thereto and the other connected with the rotatable member, said gear having a transverse slot to receive its end of the spring and terminating in a hole at one side of the ring, the spring end being a loop or eye and the slot being more than a semi-circle in cross section, a pin passing through the spring end and entering the hole and having a head fitting the slot, a hub secured to the rotatable member and forming a support for the ring, and a plate removably secured to the hub and together therewith forming an inclosure for the spring.

12. An engine starter comprising in combination with a member operatively connected with the engine, a motor, a rotatable member, a driving member mounted to travel longitudinally on said rotatable member into engagement with said engine member and also to rotate therewith, a gear ring mounted concentric with the rotatable member and driven by the motor, a hub secured to the rotatable member, a coiled spring forming the driving connection between the ring and hub, and a plate secured to the hub and forming with the latter an inclosure for the spring and a bearing for the ring.

13. An engine starter comprising in combination with a member operatively connected with the engine, a motor, a rotatable member, a driving member mounted to travel longitudinally on said rotatable member into engagement with said engine member and also to rotate therewith, a gear ring, a hub secured to the rotatable member and having a radial portion whose outer edge forms a bearing for the ring, a removable plate secured to the hub with its outer edge also forming a bearing for the ring, and a spring inclosed between the radial portion of the hub and the plate and secured respectively to the hub and ring.

14. A starter for engines comprising, in combination with a member operatively connected with the engine, a shaft having a screw threaded portion, a pinion screw-threaded on the shaft and adapted to travel longitudinally thereon and into engagement with the engine member when the shaft is rotated, said pinion having a projection on one side, and the shaft having a radial projection adapted to contact with the said projection, and means for driving the shaft.

15. A starter for engines comprising, in combination with a member operatively connected with the engine, a shaft having a screw threaded portion, a pinion screw-threaded on the shaft and adapted to travel longitudinally thereon and into engagement with the engine member when the shaft is rotated, said pinion having a projection on one side, and the shaft having a radial projection adapted to contact with the said projection, and means for driving the shaft comprising a motor and a yielding driving connection between it and the shaft.

VINCENT BENDIX.

Witnesses:
S. E. HIBBEN,
ROBERT DOBBERMAN.